United States Patent
Aly Hassan et al.

(10) Patent No.: US 11,998,870 B1
(45) Date of Patent: Jun. 4, 2024

(54) METHOD OF CAPTURING CARBON DIOXIDE USING CARBIDE SLAG

(71) Applicant: United Arab Emirates University, Al Ain (AE)

(72) Inventors: Ashraf Aly Hassan, Al Ain (AE); Amr El Dieb, Al Ain (AE); Hilal El Hassan, Al Ain (AE); Manisha Sukhraj Kothari, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/097,832

(22) Filed: Jan. 17, 2023

(51) Int. Cl.
*B01D 53/04* (2006.01)
*B01J 20/30* (2006.01)

(52) U.S. Cl.
CPC ...... *B01D 53/0438* (2013.01); *B01J 20/3078* (2013.01); *B01D 2257/504* (2013.01); *B01J 2220/4887* (2013.01)

(58) Field of Classification Search
CPC .............. B01D 53/04; B01D 53/0438; B01D 2257/504; B01J 20/3078; B01J 2220/4887
USPC ............. 96/108; 95/139; 423/230, 439, 441, 423/442; 502/400, 401, 439
See application file for complete search history.

(56) References Cited

U.S. PATENT DOCUMENTS

| | | | | |
|---|---|---|---|---|
| 6,310,129 B1* | 10/2001 | Lilly | .......... | C08K 3/26 |
| | | | | 524/400 |
| 8,470,282 B2* | 6/2013 | Jensen | .......... | C01F 11/181 |
| | | | | 423/220 |
| 2013/0112115 A1* | 5/2013 | Sotillo | .......... | C04B 2/005 |
| | | | | 106/710 |
| 2021/0262320 A1* | 8/2021 | Nguyen | .......... | B01D 53/78 |

FOREIGN PATENT DOCUMENTS

| | | | |
|---|---|---|---|
| CN | 1377830 A | | 11/2002 |
| CN | 114195408 A | * | 3/2022 |
| RU | 2397829 C1 | * | 8/2010 |

OTHER PUBLICATIONS

Internet Document "Six Methods of Carbide Lime Processing" (2022), rexarc.com/blog/six-methods-of-carbide-lime-processing/.*
"Guide To Carbide Lime Applications," European Industrial Gaes Association AISBL (2017).*
Machine-generated English translation of RU 2397829 C1, published Aug. 2010.*
Machine-generated English translation of CN 114195408 A, published Mar. 2022.*

(Continued)

*Primary Examiner* — Frank M Lawrence, Jr.
(74) *Attorney, Agent, or Firm* — Boyle Fredrickson, S.C.

(57) ABSTRACT

A method of capturing carbon dioxide from a gaseous mixture at ambient temperature or higher, comprising obtaining a slurry of waste carbide slag obtained after the manufacturing of acetylene. Heating the slurry to a temperature of approximately 105° C. for two hours and sufficient to dry the slurry until a water content of about 20% of a dry mass of the carbide slag is achieved, thereby producing activated dried carbide slag. The method including contacting the activated dried carbide slag with a gaseous mixture containing $CO_2$, thereby permitting the activated dried carbide slag to capture $CO_2$.

5 Claims, 7 Drawing Sheets
(7 of 7 Drawing Sheet(s) Filed in Color)

(56) References Cited

OTHER PUBLICATIONS

Calcium Hydroxide, encyclopedia.com (2019).
Thermodynamics and Kenetic Analysis of Ca-Looping for CO2 Captures: Application of Carbide Slag, Jie Yang et al., Fuel 242, 1-11 (2019).
Kinetics of Calcination of Partially Carbonated Particles in a Ca-Looping System for CO2 Capture, I. Martinez et al., Energy Fuels 2012, 26, 2, 1432-1440 (Jan. 2, 2012).
Mechanism Analysis of Carbide Slag Capture of CO2 via a Gas-Liquid-Solid Three-Phase Fluidization System, Jie Yang et al., Journal of Cleaner Production 279, 123712 (2021).
CO2 Capture by Carbide Slag From Chlor-Alkali Plant in Calcination/Carbonation Cycles, Yingjie Li et al., International Journal of Greenhouse Gas Control 9, 117-123 (2012).
Study on Preparation and Performance of Calcium Carbide Slag Foam for Coal Mine Disaster Reduction and CO2 Storage, Lei Wu et al., Colloids and Surfaces A: Physicochemical and Engineering Aspects 606 (2020), 125322 (Dec. 5, 2020).
Evaluation of Calcium-Based Sorbents Derived from Natural Ores and Industrial Wastes for High-Temperature CO2 Capture, Theodoros Papalas et al., Ind. Eng. Chem. Res. 2020, 59, 9926-9938 (2020).
Resource Utilization of Solid Waste Carbide Slag: A Brief Review of Application Technologies in Various Scenes, Hongxia Wang et al., Waste Disposal & Sustainable Energy 2022 (Mar. 1, 2022).
How CO2 Scrubbing Works, Erwin van den Burg, ScienceBriefss (Nov. 1, 2021).

\* cited by examiner

METHOD OF CAPTURING CARBON DIOXIDE USING CARBIDE SLAG

FIELD OF THE INVENTION

The invention is related to the field of reducing greenhouse emissions. The invention further relates to a method of capturing carbon dioxide from any gaseous mixture utilizing a carbide slag.

BACKGROUND OF THE INVENTION

The growing carbon dioxide ($CO_2$) emission is a prime cause of concern for global warming and greenhouse effect. In the past two decades, the average concentration of carbon dioxide has increased by 29% due to anthropogenic activities. These activities include mining, industrial effluents, smelting of ores, fossil fuel burning, reduction in the forest cover, increase in farming, and industries, increase in the population, etc. Efforts are being made to manage or reduce the release of the carbon dioxide in the atmosphere or capture the carbon dioxide being released.

Using known processes and procedures, direct capture of carbon dioxide ($CO_2$) from atmosphere is quite difficult as the concentration of $CO_2$ is low in atmosphere compared to waste stream due to its dispersion. A large volume of air needs to be processed to remove it from the atmosphere directly. The major sources of $CO_2$ emissions are power plants, transportation, and industrial processes. Treating the $CO_2$-rich stream at the generation sources is more practically feasible. Various techniques for $CO_2$ capture and storage (CCS) known in the art include adsorption, absorption, membrane separation, cryogenics, microbial immobilization, etc. However, several disadvantages are linked to these technologies, such as operational difficulties like clogging and reflux, membrane replacement and disposal, high cost of the membranes, and low permeability issues related to membrane separation. Meanwhile, microbial immobilization is energy-intensive, climate-sensitive, and has low efficiency. Cryogenics only work at very high $CO_2$ concentrations, and absorption is very slow with high costs. Also, the absorbent used in cryogenics is highly susceptible to corrosion. Adsorption of $CO_2$ using solid adsorbents is reported as the most reliable CCS technology, as various materials can be explored as potential adsorbents. Different techniques are being developed around the world to reduce the carbon dioxide emission using adsorbents.

Once such example of an adsorbent is carbide slag. Carbide slag is an abundant industrial by-product of acetylene manufacturing. Disposal of carbide slag is a challenging task, as it can easily contaminate groundwater. Carbide slag is composed of Calcium Hydroxide. It is known that Calcium Hydroxide is an effective adsorbent for $CO_2$. Carbide slag reacts with $CO_2$ present in the waste stream to generate Calcium Carbonate ($CaCO_3$), also known as carbonation reaction. Besides the apparent benefit of $CO_2$ capture, the resultant $CaCO_3$ can be later used in different construction and industrial applications instead of natural limestone, thereby reducing its environmental footprint. However, the operation temperatures, calcination temperatures, additional requirements make it a very expensive process.

An example of a process utilizing carbide slag is an article by Yan et al., "thermodynamics and kinetic analysis of Ca-looping for $CO_2$ capture: Application of carbide slag". This article discusses the use of carbide slag for capturing of $CO_2$. However, the authors note that the temperature of the carbon dioxide capture should be more than 650° C. and lower than 900° C. Another example is an article by Martinez et al., "Kinetics of calcination of partially carbonated particles in a Ca-looping system for $CO_2$ capture". This article discusses adsorption of carbon dioxide at an ambient temperature utilizing a high temperature process of calcination of the carbide slag at about 880° c. to 900° c. to generate an active adsorbent. The above-mentioned processes for utilizing carbide slag for $CO_2$ capture are disadvantageous due to the fact that the carbide slag must be maintained at high temperatures of 650° C. to 900° C., in the first example, and 880° c. to 900° c., in the second example. More specifically, the high expense of maintaining such a high temperature is disadvantageous, from a cost perspective, as it is costly to finance the cost of such a high temperature operation. Furthermore, burning fossil fuels (either directly or indirectly through electricity usage) to maintain such high temperatures to capture carbon are entirely counter-productive from an environmental perspective, due to the emissions generated in maintaining the high temperature required to capture the carbon. In this specification, any reference to the term "ambient temperature" shall be interpreted to mean, for example, 23 degrees Celsius to 37 degrees Celsius. In this specification, the term "adsorption" shall be interpreted sufficiently broadly to include, adsorption, absorption as well as any other manner of take up/assimilation of $CO_2$ by any manner or mechanism whatsoever. Furthermore, any reference to the term "carbide slag" shall be interpreted sufficiently broadly to include all forms of carbide slag such as, for example carbide lime residue, carbide lime, calcium carbide, calcium carbide residue, calcium carbide slag, carbide slag, and acetylene sludge, and the like.

SUMMARY OF THE INVENTION

The inventors have developed a new method of capturing carbon dioxide at ambient temperature using a carbide slag. The carbide slag is, more specifically, activated carbide slag which is activated at a comparatively low temperature. The carbide slag, more specifically, captures $CO_2$ at ambient temperatures. After $CO_2$ capture, the carbide slag containing the captured $CO_2$ is advantageously reusable as a waste-derived resource. More specifically, the carbide slag containing the captured $CO_2$ is suitable as a replacement for natural limestone in various industrial and construction applications.

According to one aspect of the invention, there is provided a method of capturing carbon dioxide from a gaseous mixture at ambient temperature or higher, said method comprising
  obtaining a slurry of carbide slag;
  heating the slurry of carbide slag to a temperature of approximately above 85° C. for a time sufficient to dry the slurry thereby producing activated dried carbide slag; and contacting the activated dried carbide slag with the gaseous mixture containing $CO_2$, thereby permitting the activated dried carbide slag to capture $CO_2$.

The slurry of carbide slag may be a waste carbide slag. The waste carbide slag may be a waste product obtained after the manufacturing of acetylene.

The ambient temperature may be any temperature in the range of about 23° C. to 37° C.

The slurry of carbide slag may be at least partially dried until a water content of between 10% to 40% of a dry mass of the carbide slag is achieved. In a particular embodiment, the slurry of carbide slag may be at least partially dried until a water content of about 20% of a dry mass of the carbide slag is achieved.

The step of activating the carbide slag may comprise heating the carbide slag to a temperature of about 85° C. to about 115° C. In a particular embodiment, the step of activating the carbide slag may comprise heating the carbide slag to a temperature of about 105° C. for two hours.

The gaseous mixture may be any gas containing carbon dioxide in gaseous form selected from any of or combination of: effluent gases, atmosphere, gaseous reaction products and carbon dioxide enriched gas stream.

The method may further comprise humidifying the gaseous mixture before contacting the carbide slag. The step of humidifying the gaseous mixture may comprise mixing the gaseous mixture with an aqueous medium before contacting with the dried carbide slag.

The method may further comprise adsorbing carbon dioxide from the gaseous mixture onto the activated carbide slag.

The step of heating the carbide slag slurry may not cause calcination of the carbide slag slurry.

An energy efficient method of manufacturing active carbide slag adsorbent for capturing carbon dioxide from a gaseous mixture at an ambient temperature, said method comprising obtaining carbide slag;

regulating a water content of the carbide slag such that the water content of the carbide slag is approximately 10% to 40% of a dry mass of the carbide slag.

The water content of the carbide slag may be regulated such that the water content of the carbide slag is approximately 20% of a dry mass of the carbide slag.

The step of regulating the water content of the carbide slag comprises heating the carbide slag at a temperature of about 105° C.

The step of heating the carbide slag is carried out for about 2 hours.

The gaseous mixture may be any gas containing carbon dioxide in gaseous form selected from any of or combination of effluent gases, atmosphere, gaseous reaction products and carbon dioxide enriched gas stream.

The invention extends to an activated adsorbent manufactured by the method described hereinabove.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further features of the invention are described hereinafter by way of a non-limiting example of the invention, with reference to and as illustrated in the accompanying diagrammatic drawing. In the drawings.

DETAILED DESCRIPTION OF THE INVENTION

Carbide Slag Starting Material

Carbide slag is a waste material generated in high volumes as a by-product of the hydrolysis of calcium carbide. The carbide slag is generally considered waste and sent to landfills. It is commonly generated during the industrial production of acetylene, ethylene, polyvinyl chloride, acetone and other chemical products.

The waste carbide slag material generated during the above indicated industrial processes was used as a carbide slag starting material. This starting material is in the form of a carbide slag slurry.

Carbide slag slurry is also known as calcium carbide residue (CCR). Carbide slag slurry is also generated as a by-product/waste during the manufacturing of acetylene. This residue is high in calcium hydroxide with trace amounts of other metal oxides such as magnesium oxide, aluminium oxide, iron oxide, silica, etc.

Method of Preparation of Activated Carbide Slag

The inventors have developed a novel and inventive method of preparing a highly activated carbide slag using the carbide slag slurry generated from the industrial production of acetylene.

An activated carbide slag is prepared from carbide slag.

For the manufacturing of activated carbide slag, waste carbide slag was obtained in the form of a slurry. The slurry is available in a semi-solid state. To enable its use in the adsorption of carbon dioxide, it must be available in a solid state. To prepare a solid carbide slag, the slurry was taken in a shallow dish type container and placed in a heated enclosure to dry. The temperature was maintained such that it is sufficient enough to dry the slurry but not high to cause calcination. The temperature of the enclosure is maintained at a temperature of about 85° C. to 115° C. More preferably, the temperature of the enclosure was maintained at about 105° C.

The heated chamber or enclosure or vessel may be in the form of an oven, a dehydrator, temperature-controlled container. These chamber/enclosures/vessels may be either electric, steam powered, conventional, using convention heat, using microwave heat, etc. to name a few.

Before the drying process, heavier particles of the slurry settle at the bottom of the dish and are separated from the supernatant. The supernatant is composed mainly of water.

The time required to dry the slurry is dependent on the nature of slurry, for example, its wetness, additional impurities, water content, the nature of impurity and the impurity content. Additional components that effect the time required for drying include type of container, the material of manufacture, width and depth of the container, etc. It is observed that a standard carbide slag slurry obtained after the manufacturing of the acetylene, in a standard shallow dish type container takes about 2 hours-time for complete drying. The standard shallow dish container is more particularly in the form of a stainless steel tray with dimensions of (25 cm×25 cm×3 cm). In use, 1.5 L volume of carbide slurry was spread over the tray with approximately 2.5 cm thickness.

It is to be noted that depending on the nature of the container, and the variation of temperature, the time taken for drying the slurry may be above and below 2 hours-time.

After 2 hours of drying, the dried carbide slag slurry is in the form of a solid mass. This solid mass may be used as is or may be broken down into small pieces or formed into a crumbly or a powdered texture.

There are multiple ways to break down the solid mass into the smaller particles. These range from breaking up the mass with a motor and pestle, manual hammering, pneumatic knocking, shaking, applying vibration, etc.

Figure 3:
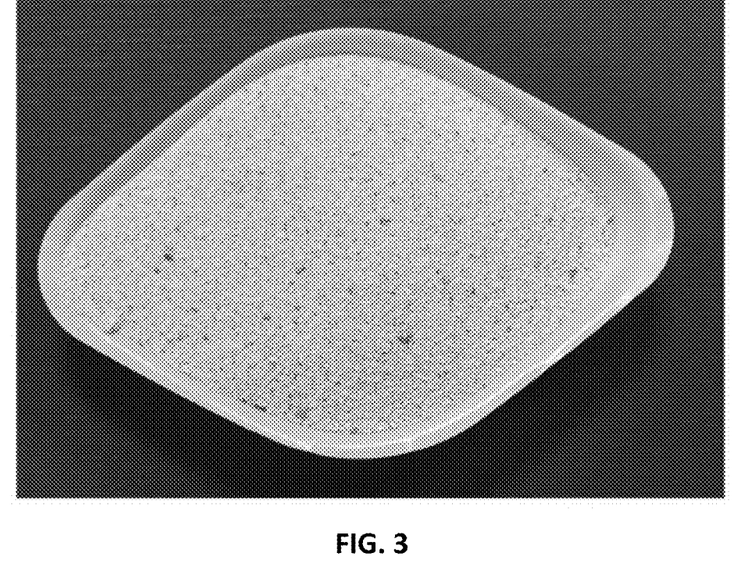
FIG. 3 shows an image of activated carbide slag powder.

In a preferred embodiment, the dried carbide slag is used in the form of a powder as shown in FIG. 3. The powder was white in color with approximately 2700 kg/cubic meters density. 85% of the carbide slag powder sample had its particle size below 140 micron.

The powder nature of the dried activated carbide slag presents major advantage in terms of its handling, storage and usability. In terms of handling, as the activated carbide slag is in the powder from, it becomes easier to manage and the pourability is easier managed. In terms of storage, storing a powder is much easier as compared to a liquid. A powder in general will have a better physiochemical stability and a longer shelf life.

The carbide slag powder obtained by the aforementioned process is capable of reacting with carbon dioxide, in other words, it is already activated. Therefore, the dried carbide slag is also referred to as activated carbide slag. Slightest exposure to the atmosphere will cause the activated carbide slag powder to react with the carbon dioxide in the atmosphere. To enable the use of the activated carbide slag at a later stage, the activated carbide slag was stored in airtight containers without exposure to the atmospheric gases.

Airtight storage may be achieved by storing in airtight containers, or vacuum sealed containers. There are numerous methods and equipment available in the art to ensure airtight configuration of the containers. These techniques are incorporated herein by reference and therefore not elaborated.

Process for Using Activated Carbide Slag for Capturing Carbon Dioxide

The dried carbide slag powder or activated carbide slag is activated. Even a slightest exposure to the external carbon dioxide may cause the activated carbide slag powder to react with carbon dioxide.

Depending on the source of gaseous mixture from where the carbon dioxide is to be adsorbed, there is provided different methods for usage of the dried activated carbide slag powder.

Example 1

Figure 1:
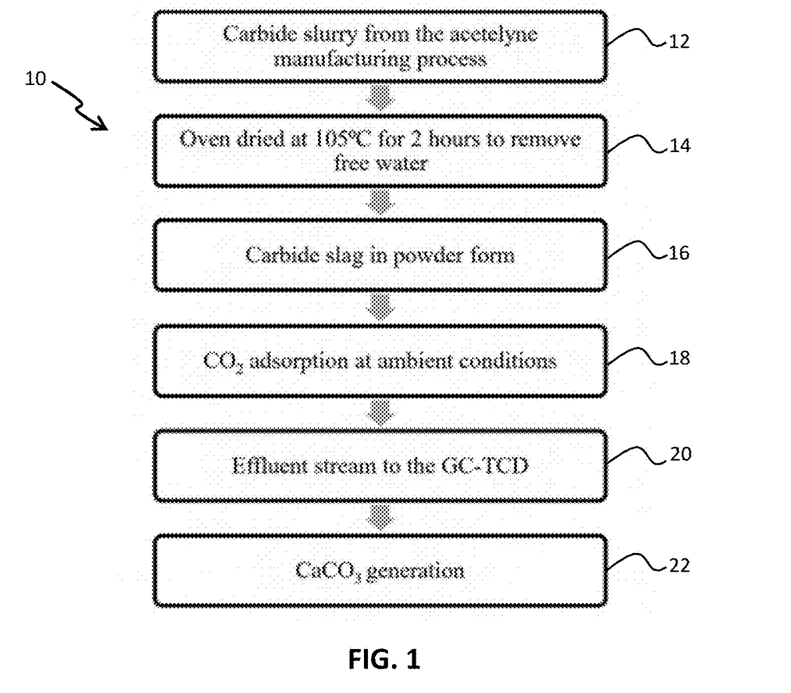
FIG. 1 shows a block diagram of the process of capturing carbon dioxide using carbide slag.

The complete process for preparation of activated carbide slag, in accordance with the invention, for adsorption of $CO_2$ and for generation of calcium carbonate is designated generally with the reference numeral 10 and is illustrated in FIG. 1 and described hereinbelow. In a first step 12 of an embodiment of the invention, the carbide slag is obtained as a waste product from the manufacturing of the acetylene. This waste carbide slag is taken in the form of a slurry. During the storage time, heavier particles of the slurry settled at the bottom, leaving the supernatant at the top. The supernatant is composed of water and can be removed easily. In a second step 14, the slurry was then dried in an oven at a temperature of about 105° C. for 2 hours. After 2 hours drying time, the water was completely evaporated, leaving behind dried activated carbide slag 16. This carbide slag was predominantly in the form of a powder 16. The larger particles obtained after drying can be broken down to smaller particles for further use. The smaller particles of the carbide slag powder 16 are preferred due to the larger surface area it presents during adsorption. The dried carbide slag powder 16 is already activated. This activate carbide slag 16 was then used in a third step 18 to react with the influent gas stream containing carbon dioxide at an ambient temperature. The gas stream may be any of or combination of effluent gases, atmosphere, gaseous reaction products and carbon dioxide enriched gas stream. In a fourth step 20, the effluent gases collected after reaction with the activated carbide slag 16 were taken for further analysis. One of the analyses included identification of the composition of effluent gas using GC-TCD. The results of the analysis will be discussed below in FIG. 13. Upon observation of the reacted activated carbide slag in a fifth step 22, it was observed that the calcium hydroxide in the activated carbide slag reacted with the $CO_2$ to form calcium carbonate.

Example 2

Figure 2:
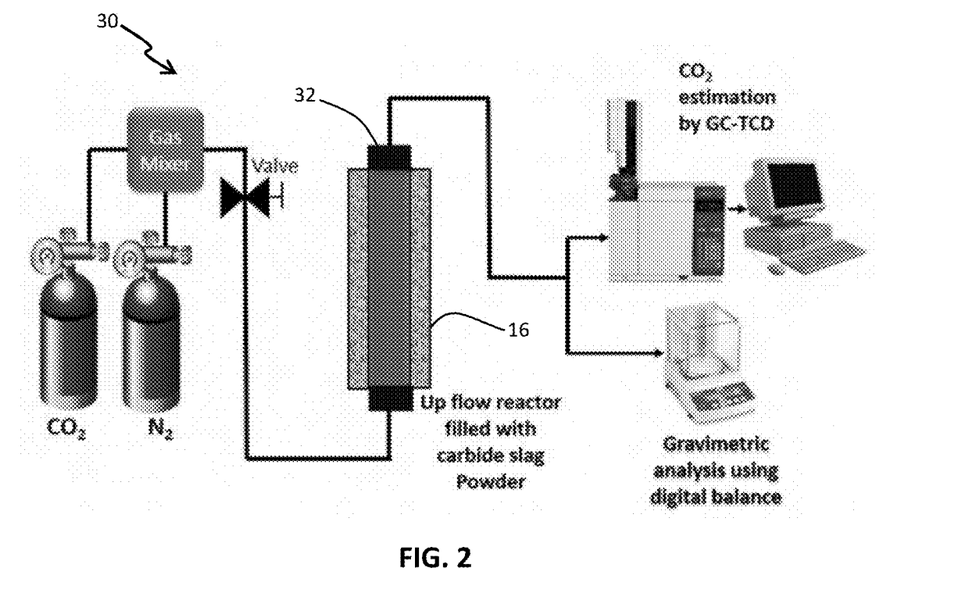
FIG. 2 illustrates a process of capturing carbon dioxide utilising a fixed bed reactor.

Another example of the process of removal of carbon dioxide from the gas stream, in accordance with the invention, is designated generally with reference numeral 30 and is illustrated in FIG. 2 of the drawings and described hereinbelow. FIG. 2 describes an embodiment of using an up-flow reactor 32 filled with activated carbide slag 16 to adsorb carbon dioxide from the gas stream.

This embodiment describes removal of carbon dioxide from a gas stream comprising of carbon dioxide and nitrogen gas. A gaseous mixture of carbon dioxide and nitrogen gas is prepared for testing the reaction ability of activated carbide slag 16. This mixture is passed through the up flow reactor 32 from the bottom of the up-flow reactor. The up-flow reactor 32 is packed with activated carbide slag 16. The gaseous mixture is passed into the up-flow reactor 32 from the bottom portion of the reactor through an opening in the up-flow reactor. The gaseous mixture moves upwards in the reactor and exits through the opening present in the top portion of the reactor. The carbon dioxide in the gaseous mixture reacts with the activated carbide slag 16 packed inside the reactor to form calcium carbonate. The exit gas is collected for qualitative and quantitative analysis to detect carbon dioxide. These are further illustrated in FIGS. 8, 9, 10 and 11.

Example 3

Another example, of a method of capturing carbon, in accordance with the invention, is removal of carbon dioxide from an enclosed room. The dried carbide slag powder 16 may be stored in an open container and placed in any part of the room. The activated carbide slag powder 16 will continuously adsorb carbon dioxide from the atmosphere until it reaches a saturation and can no longer adsorb more carbon dioxide. As the carbon dioxide is adsorbed on the surface of the activated carbide slag 16, it may be advantageous to have the activated carbide slag 16 mixed or turned upside down from time to time, to enable its prolonged and complete usage.

Example 4

Another example, in accordance with the invention, is adsorption of carbon dioxide from an effluent gas stream in an industry chimney. It is known that the effluent gas streams in industries are rich in carbon dioxide. The effluent gas stream may be redirected by means of a pipe or valve towards a column packed with activated carbide slag 16. The carbon dioxide in the effluent gas stream upon contact with activated carbide slag 16 will react with the carbide slag 16 and forms calcium carbonate. This will help in reducing the carbon dioxide from the effluent gas stream thereby reducing the greenhouse effect.

As the activated carbide slag 16 is capable of reacting with gaseous mixture containing carbon dioxide, it may find its uses in numerous applications such as industrial $CO_2$ scrubbing systems, processing plants, energy plants, fertilizer plants, chemical manufacturing plants, any factories using combustion, such as ore melting, destruction of goods, glass manufacturing, paint manufacturing etc. to name a few.

Example 5

In another embodiment of the invention, adsorption of carbon dioxide from a gas stream is provided in the presence of humidity. Waste gases or gases containing carbon dioxide is first humidified with water before contacting with activated carbide slag 16. It is observed that the humidified gases react with activated carbide slag 16 and form calcium carbonate on the surface of the activated carbide slag.

As the activated carbide slag 16 is capable of reacting with carbon dioxide from a humidified gaseous mixture, the activated carbide slag 16 finds its uses in numerous applications such as filters in an air conditioning unit, air purifiers, Heating, ventilation, and air conditioning (HVAC).

Example 6

Figure 14:
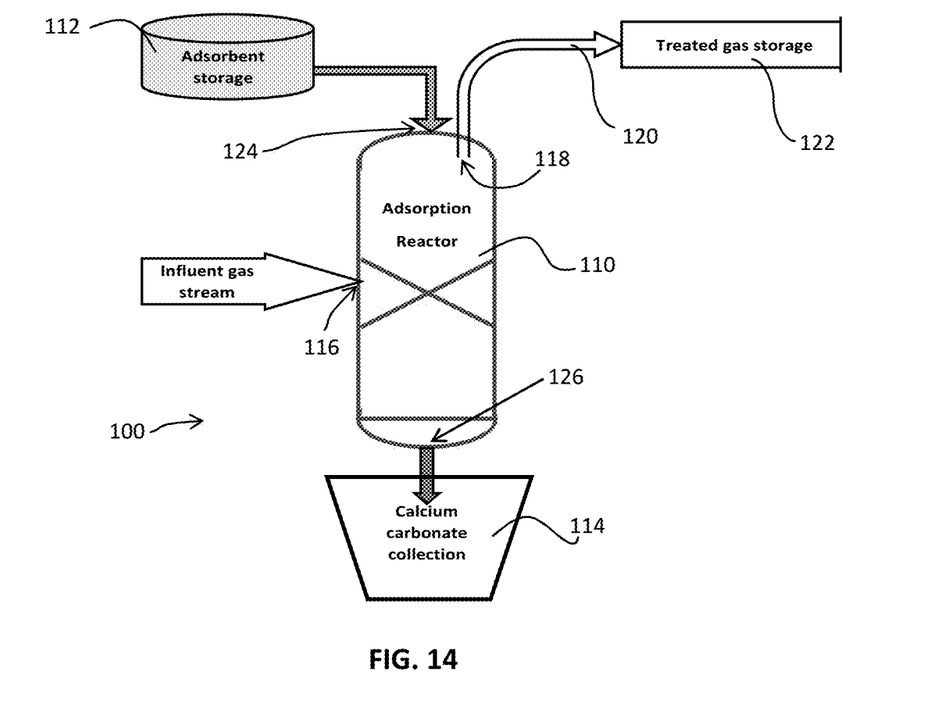
FIG. 14 shows a schematic illustration of an apparatus and method of capturing carbon, in accordance with the invention.

With reference to FIG. 14 of the drawings, an apparatus for capturing carbon at ambient temperature, in accordance with the invention, is designated with the reference numeral 100.

The apparatus 100 includes a reactor vessel 110, an adsorbent storage 112, a calcium carbonate collection bin 114 and a treated gas storage vessel 122.

The reactor vessel 110 has a gas inlet 116, a gas outlet 118, an adsorbent inlet 124 and an adsorbent outlet 126.

The gas inlet 116 is operable for receiving an influent gas stream into an interior of the vessel 110. The gas outlet 118 leads out of the reactor vessel 110 and is connected via a pipe 120 to the gas storage vessel 122.

In use, the interior of the reactor vessel 110 is filled with activated slag 16, which flows from the adsorbent storage 112 via adsorbent inlet 124 into the interior of the reactor vessel 110. In use, the influent gas passes through and over the activated slag 16 contained in the vessel 110 and exits the reactor vessel 110 via the gas outlet 118 and is collected via pipe 120 into the treated gas storage vessel 122.

More specifically, in use, the apparatus 100 provides for the continuous processing of an effluent gas stream which is brought into direct contact with activated slag 16 contained in the vessel 110. The activated slag 16 is thus operable, in use, for capturing carbon from the influent gas stream, which is then directed through the activated slag 16 and directed out of the vessel 110 via the gas outlet 118 and pipe 120 for ultimate collection and storage in the treated gas storage vessel 122.

As shown in FIG. 14, once the carbon is captured by the activated slag, the resulting product, as explained hereinabove, is calcium carbonate, which then exits the vessel 110 via the adsorbent outlet 126 and is collected in the calcium carbonate collection bin 114.

The adsorption of carbon as described hereinabove can be used for purifying effluent gas streams from various industrial activities such as fermentation processes, hydrogen production, ethanol production, cement production process, natural gas processing, petroleum refineries, iron and steel industry, ethylene odixe production, automobiles, fuel/wood-burning space heater chimney etc.

The invention extends to a method of carbon capture as described hereinabove.

Characterization of the Activated Carbide Slag Powder

FIG. 3 shows the activated carbide slag powder 16 obtained after the drying process.

The carbide slag powder 16 samples were characterized using various instrumental analyses. Post drying, the mineralogy of the carbide slag sample powder was analysed by an X-Ray diffractometer (XRD, PANalytical, Netherlands).

It was found that the carbide slag samples comprised mostly of elemental oxides, as shown in table 1.

TABLE 1

| ED-XRF analysis of carbide slag powder | | | |
|---|---|---|---|
| Elements | % (w/w) | Oxides | % (w/w) |
| Ca | 98.178 | CaO | 95.909 |
| Si | 1.6 | $SiO_2$ | 2.644 |
| S | 0.163 | $Fe_2O_3$ | 0.598 |
| Ti | 0.06 | Cl | 0.373 |
| | | $SO_3$ | 0.288 |
| | | SrO | 0.078 |
| | | $TiO_2$ | 0.05 |

It was found that that the calcium oxide content in the carbide slag powder 16 sample was exceptionally high, in the range of approximately 96% w/w, followed by $SiO_2$ in the range of 2.6% w/w. It was observed that other metal oxides such as $Fe_2O_3$, Cl, $SO_3$, SrO, and $TiO_2$ contents were in comparatively lesser quantities. The loss on ignition analysed for the carbide slag powder is 0.626%.

The elemental analysis of samples was conducted by a dispersive energy x-ray Fluorescence (EDX-7000, Shimadzu).

The particle size distribution of the carbide slag powder 16 was determined using a laser particle size analyser (IS 13 320 XR, Beckman-Coulter, USA). The Brunauer-Emmett-teller(BET)method was employed to calculate the specific surface area, while Barrett-Joyner-Halenda (BJH) method was used to calculate the pore diameter and measurement distribution.

Figure 4:
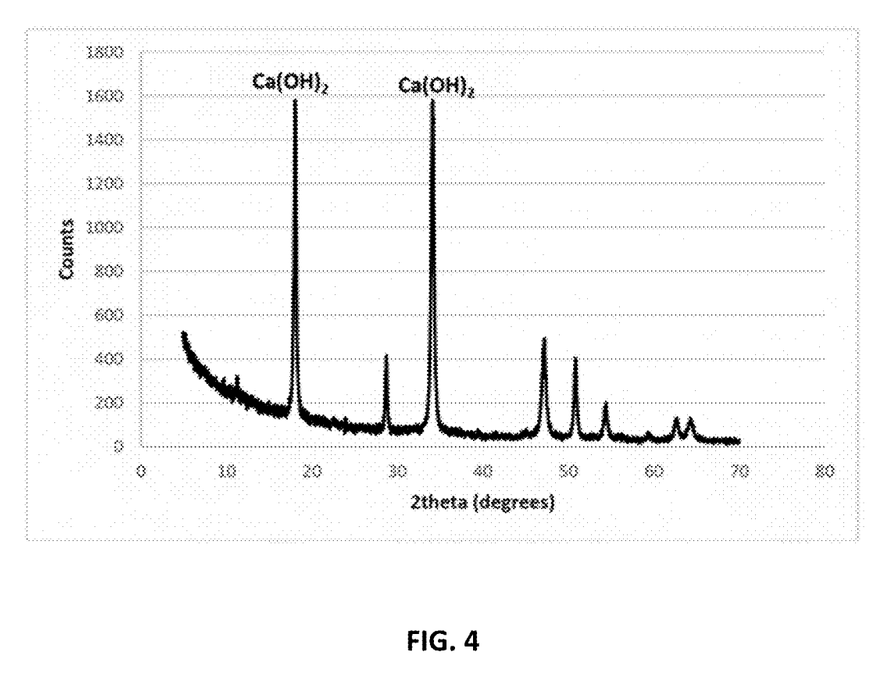
FIG. 4 shows an X-Ray Diffraction (XRD) analysis of activated carbide slag powder.

FIG. 4 illustrates the XRD spectra of the carbide slag powder 16 sample. As confirmed by the Energy Dispersive X-ray Fluorescence (ED-XRF) analysis, the main component identified in the carbide slag powder 16 was Ca(OH)2(portlandite) with intense peaks at 2 theta values of 18.07, 34.11, and 28.7. Conversely, other components, such as magnetite, were detected at 2 theta value of 49.4 with minimum portions of gamete, mohite, and megakalsilite.

Figure 5:
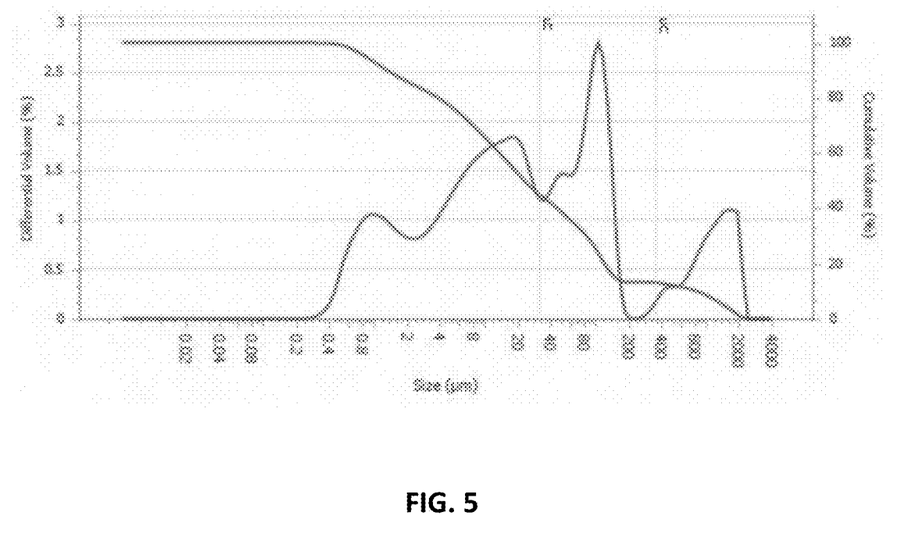
FIG. 5 shows particle size distribution for activated carbide slag powder.

FIG. 5 illustrates the particle size distribution of the carbide slag powder 16. Measurements taken by the laser particle size analyser. The results provided that the carbide slag power 16 consists of a mixture of different particle sizes in the range of 0.2 to 2000 microns. It can be seen from FIG. 5 that nearly 85% of the carbide slag powder sample had its particle size below 140 microns. Both the blue line and the red line in FIG. 5 represents carbide slag powder 16. The blue line represents differential volume (%) (Left Y-axis in graph) against particle size. While the redline represents cumulative volume (%) (Right Y-axis in graph) against particle size.

Size of the particles play a major role in the adsorption, as smaller the size, larger the surface area for reacting with the carbon dioxide. This will aid in more efficient removal of carbon dioxide from the stream of gaseous mixture.

Figure 6:
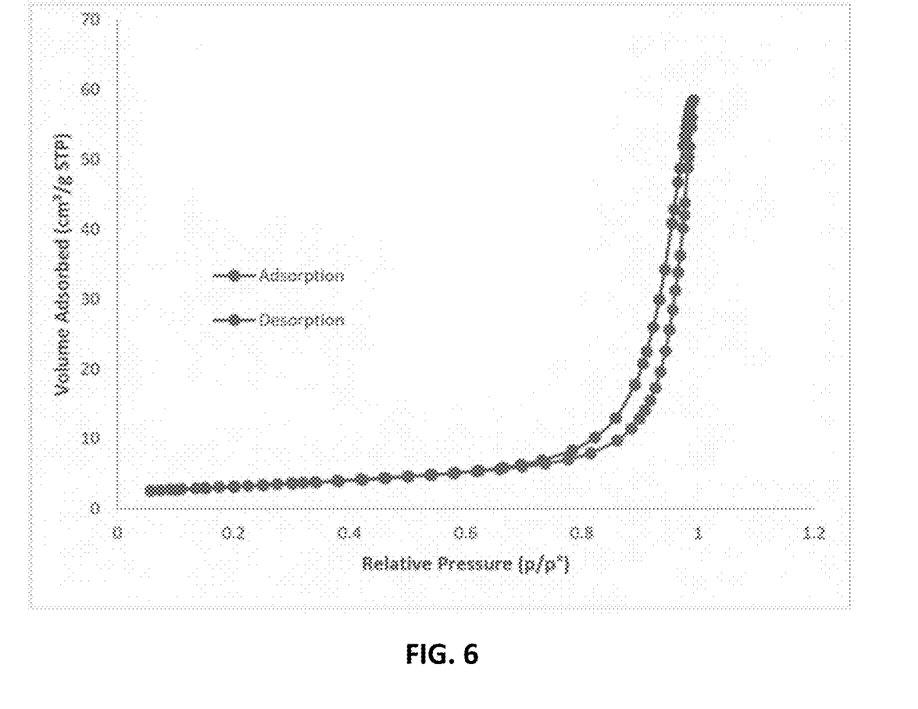
FIG. 6 shows $N_2$ adsorptions isotherms for activated carbide slag powder.

The surface area and pore size analysis were conducted by nitrogen adsorption-desorption evaluation using micro active for Tristar ii plus version 2.03 analyzer. FIG. 6 illustrates the N2 adsorptions and desorption isotherm. The N2 adsorption and desorption results are used to better understand the physical components such as the surface area, pore volume and pore size distribution. Based on the graph provided in FIG. 6, it is observed that the pore volume of the activated carbide slag powder 16 was 0.083 cm3/g and the Brunauer-Emmett-Teller (BET) surface area obtained 11.16 m2/g.

Figure 7A:
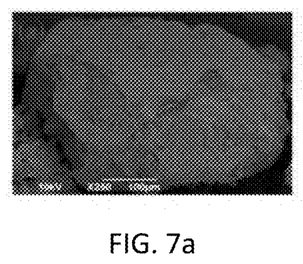
FIGS. 7a-7c show Scanning Electron Microscope (SEM) images of unused carbide slag powder (before $CO_2$ capture)
Figure 7B:
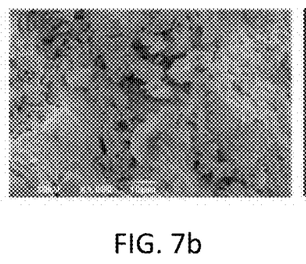
Figure 7C:
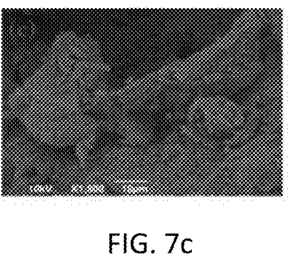
Figure 7D:
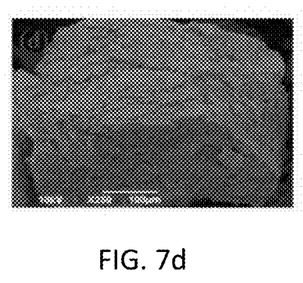
FIGS. 7d-7f show SEM images of used activated carbide slag powder (after $CO_2$ capture)
Figure 7E:
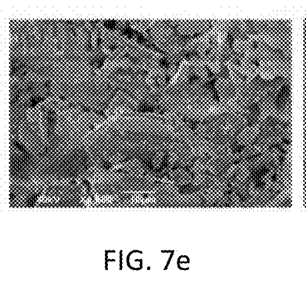
Figure 7F:
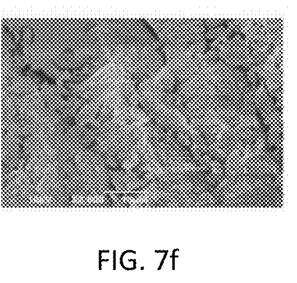

The surface morphology of the carbide slag powder 16 was observed by a scanning electron microscope (SEM, JeolJSM-6390A). FIGS. 7(a-c) illustrates the SEM images of unused activated carbide slag powder 16 at three different magnifications (x250, x1,000 and x1500). It is seen that the activated carbide slag powder 16 does not have a specific crystalline structure. It is observed that the surface of each single particle of the carbide slag powder 16 is comparatively smooth.

As provided by the N2 adsorption and desorption results and the SEM images in FIGS. 7(a-c), it is observed that each particle consists of porous structures. These porous structures enable $CO_2$ diffusion during adsorption process.

FIG. 7(d-f) illustrates SEM images of used carbide slag powder after its application for $CO_2$ capture at three different magnifications (x250, x1500, and x2000). FIG. 7 (d) illustrates the appearance of cracks on the surface of activated carbide slag powder particles. These cracks indicate the reaction of carbide slag powder ($Ca(OH)_2$) with carbon dioxide to generate calcium carbonate. It is known in the art that calcium carbonate crystal is present in small tetrad shape. The tetrad shaped crystals observed in FIG. 7(e) and FIG. 7(f) is therefore attributed to the presence of calcium carbonate crystal.

Performance Evaluation of Carbide Slag Powder for CO2 Capture

The $CO_2$ adsorption performance of the carbide slag powder 16 was characterized by conducting lab-scale experiments at ambient temperature and pressure. Experiments were carried out using a 12-cm long column with a 4-cm diameter as an up-flow fix bed reactor. A mixture of 25% $CO_2$ and 75% air was used as an influent stream to capture $CO_2$ directly. Carbide slag powder 16 was filled in the column. The gas stream with 25% $CO_2$ and 75% air was passed through the reactor.

Multiple experiments were run with different volumes of the carbide slag powder 16: 5, 10, 15, 20, and 25 g at the flowrate of 12.5 ml/min.

All experiments were performed in duplicates at ambient temperature and pressure. The mass of carbide slag powder 16 was analysed after the reaction using a digital balance to examine the change of mass. The $CO_2$ capture capacity (ccc,%) was calculated using eq. 3. Meanwhile, the adsorbed mass of $CO_2$, which indicates the change in adsorbent mass, was calculated using eq. 4 for GC-TCD observations.

$$CO_2 \text{ capture capacity } (\%) = \frac{\text{change in mass of adsorbent} * 100}{\text{Initial mass of adsorbent}} \quad (3)$$

$$\text{Mass of } CO_2 \text{ Adsorbed (mg)} = \int_0^t [(C_{in} - C_{out})]dt * \text{flowrate} * 0.018 \quad (4)$$

Where, $C_{in}$ and $C_{out}$ is the concentration of $CO_2$ (%) in the influent and effluent gas stream at time "t", respectively. "t" is time in minutes, flowrate is in ml/min, and 0.018 is the conversion factor for the concentration of $CO_2$ (% to mg/ml).

For purpose of comparison, in a separate embodiment, the influent gas stream was passed through water to evaluate the effect of humidity on the $CO_2$ capture capacity. The effluent gas was directly analysed using gas chromatography (GC) connected to a thermal conductivity detector (TCD). Experiments were run until reaching equilibrium when the concentration of $CO_2$ reached 25% in the effluent gas stream. In other words, the concentration of $CO_2$ in the influent and effluent gas became equal.

Figure 8:
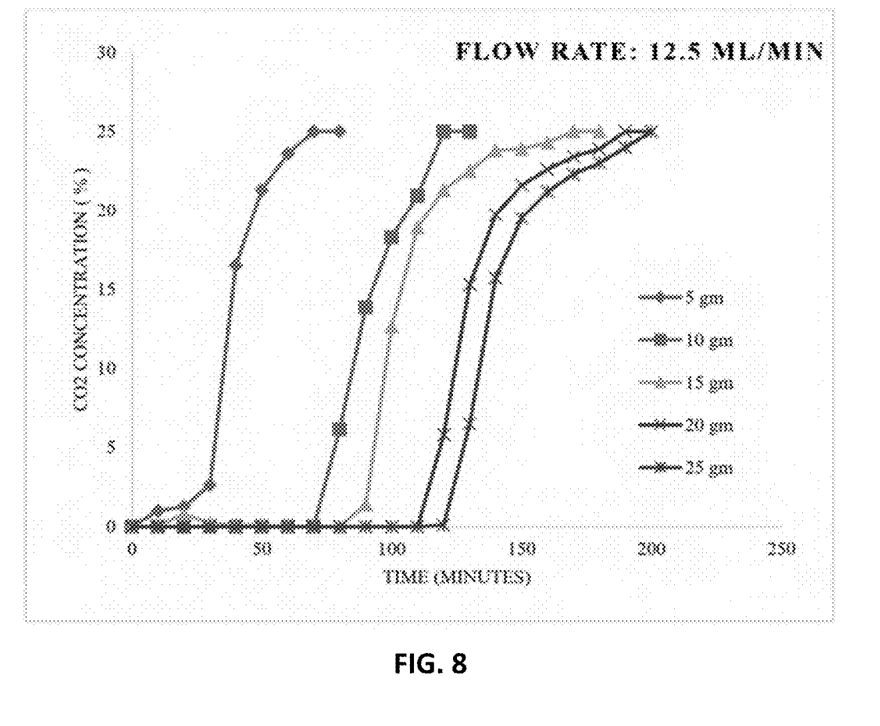
FIG. 8 shows a breakthrough curve for $CO_2$ adsorption using different masses of activated carbide slag adsorbent.
Figure 9:
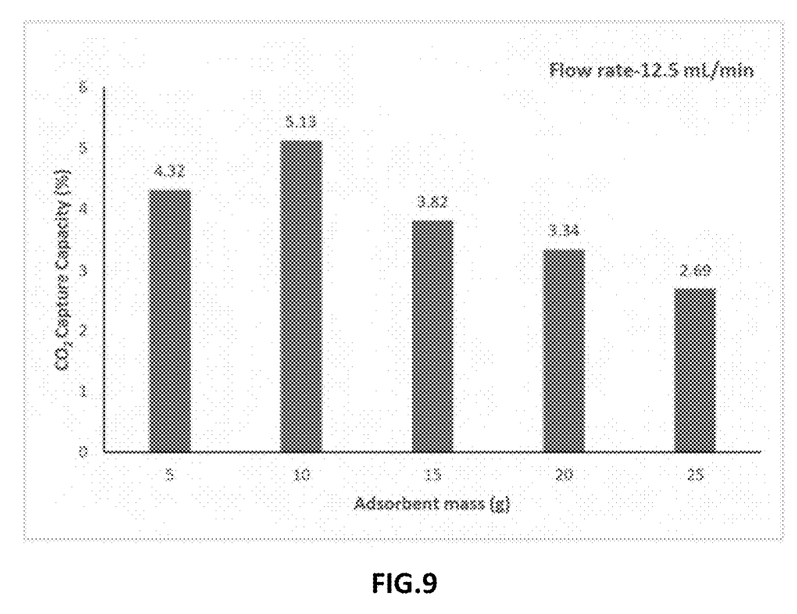
FIG. 9 shows a graph illustrating the effect of activated carbide slag adsorbent mass on $CO_2$ capture capacity.

Effect of adsorbent mass on the $CO_2$ capture potential of carbide slag powder 16 is illustrated in FIG. 8. FIG. 8 shows the results of the adsorption experiment conducted in the lab-scale reactor at a flow rate of 12.5 ml/min using five different masses (5, 10, 15, 20, and 25 g) of adsorbent. It can be observed from FIG. 8 that $CO_2$ was adsorbed on the surface of activated carbide slag powder 16. The gravimetric analysis reported that the mass of the adsorbent increased after treatment, providing evidence of the adsorption of carbon dioxide by the carbide slag powder. The breakthrough point was considered when the effluent concentration of $CO_2$ reached the same concentration as that of the influent.

The results illustrated that the breakthrough point for 5 g adsorbent mass was attained in 70 minutes. Meanwhile, increasing the mass of adsorbent to 10, 15, 20, and 25 g increased the time required to reach the breakthrough point to 120, 170, 190, and 200 minutes, respectively. Moreover, the carbon capture capacity of carbide slag powder increased from 4.32 to 5.13%, with an increase in mass of adsorbent from 5 g to 10 g is demonstrated in FIG. 9. However, further increment in the mass of adsorbent to 15, 20, and 25 g resulted in decreased carbon dioxide capture capacity of 3.82, 3.34, and 2.69%, respectively. This indicates that the adsorbent's carbon capture potential was not utilized when its mass increased above 10 g. This may be due to the lack of mixing inside the reactor that hindered the surface contact between the influent gas stream and the available adsorbent surface.

$CO_2$ capture capacity is defined as mass of $CO_2$ (gm) adsorbed per mass of adsorbent material(gm). It is represented as percentage.

$CO_2$ capture capacity is calculated according to equation;

$$CO_2 \text{ capture capacity (\%)} = \frac{\text{mass of } CO_2 \text{ adsorbed (gm)} * 100}{\text{mass of adsorbent (gm)}}$$

Accordingly, 5.13% means that 0.0513 gm of $CO_2$ is adsorbed per gm of adsorbent material.

Figure 10:
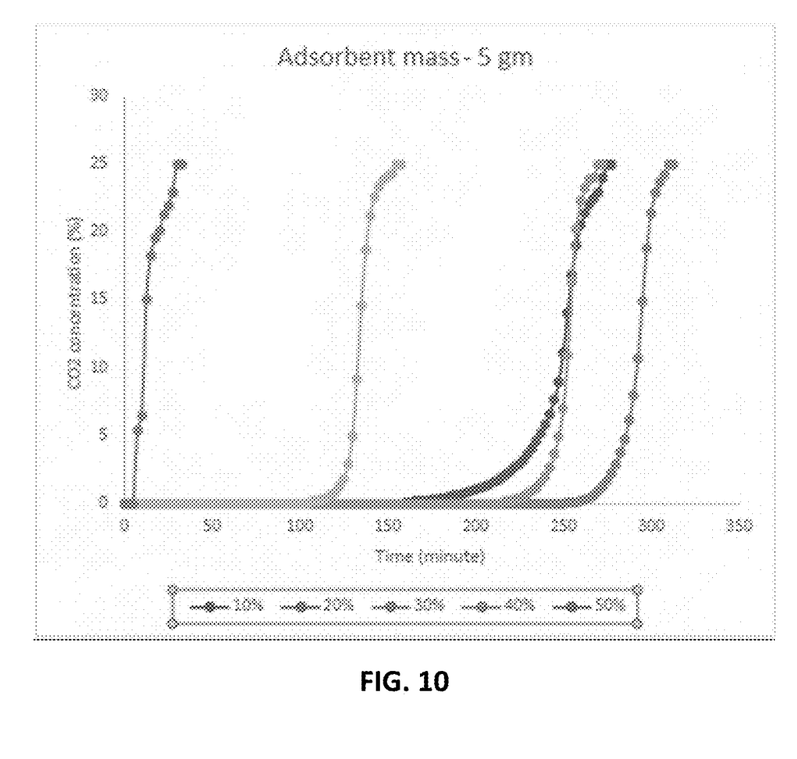
FIG. 10 shows a breakthrough curve of $CO_2$ adsorption at different water content.
Figure 11:
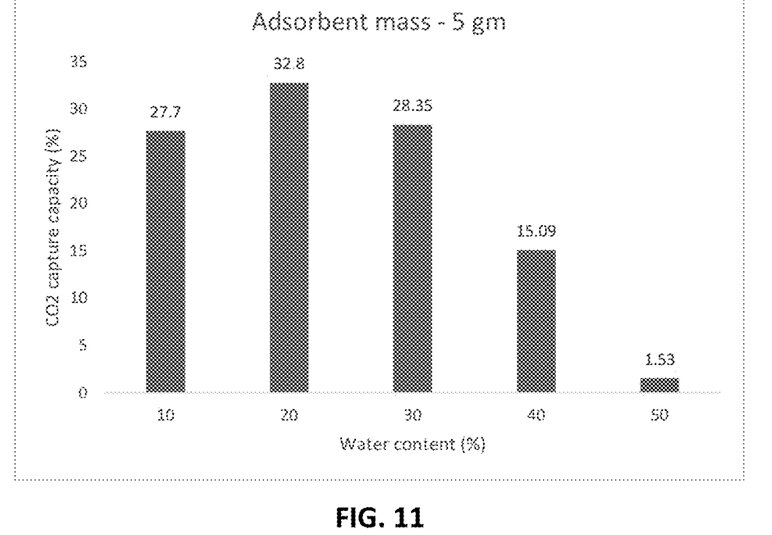
FIG. 11 shows a graph illustrating the effect of water content on carbon dioxide capture capacity.

Effect of water content on the $CO_2$ capture potential of carbide slag powder:

The impact of presence of water content in the adsorbent material on the $CO_2$ capture capacity of carbide slag powder 16 was evaluated by adding the calculated volume of water into adsorbent samples to make sure that water content is (10, 20, 30, 40, and 50)% with dry mass of adsorbent being constant 5 gm for all the experiments. Adsorption experiments were conducted at a constant flow rate of 12.5 mL/min at ambient temperature and pressure. FIG. 10 shows breakthrough curve for various water content (10, 20, 30, 40, and 50%) on the $CO_2$ capture capacity of activated carbide slag powder 16. Breakthrough curves for 10% and 30% water content were extended till 240 minutes while longest breakthrough curve of 300 minutes was observed for 20% water content. Further increase in water content to 40% and 50% resulted in comparatively shorter break through curves of 155 and 30 minute, respectively. As indicated in FIG. 11 addition of 10% water content in adsorbent has improved the $CO_2$ capture capacity to 27% instead of dry adsorbent which is 4.3%. Maximum $CO_2$ capture capacity of ~32% was observed at 20% water content. Moreover, increasing water content to 40% resulted in 28% $CO_2$ capture capacity. Further increase of water content to 50% led to dramatic fall in $CO_2$ capture capacity of 1.5%.

Figure 12:
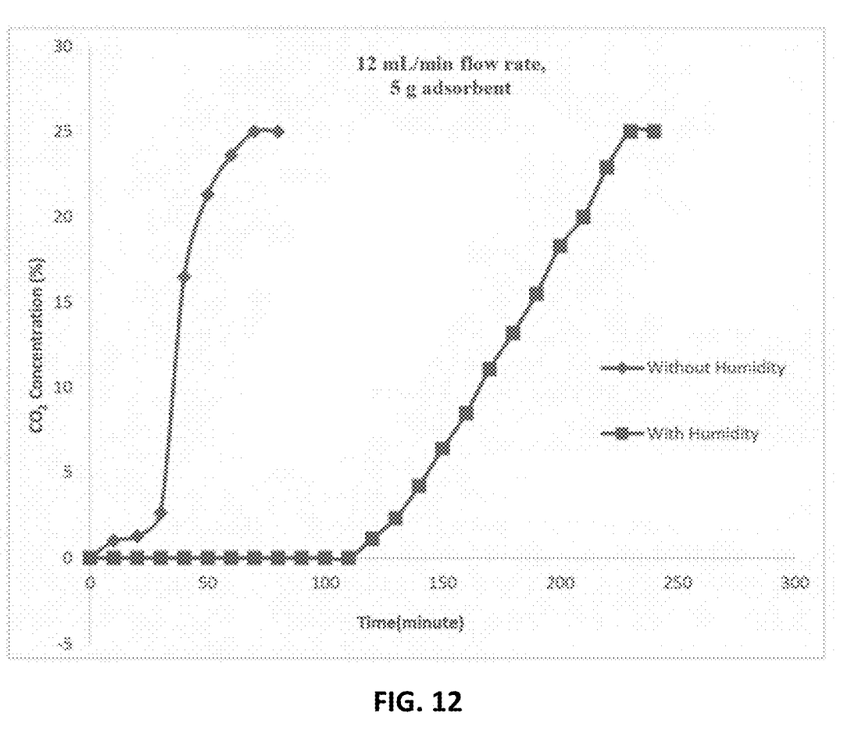
FIG. 12 illustrates an effect of the presence of humidity on carbon dioxide capture capacity.

Effect of humidity on the $CO_2$ capture potential of carbide slag powder:

The impact of humidity on the $CO_2$ capture capacity of carbide slag powder 16 was evaluated by humidifying the influent gas stream. Adsorption experiments were conducted at a constant flowrate of 12.5 ml/min with 5 g adsorbent mass for both dry gas stream and humidified gas stream. As indicated in FIG. 12, the time required to reach the breakthrough point was 70 minutes during the dry gas stream experiment, while, in the presence of humidity, it reached up to 230 minutes. The $CO_2$ capture capacity of carbide slag powder 16 improved from 4.32% to 19.75% in the presence of humidity. Clearly, the humidity or free water in the system enhanced the reaction efficiency, as it acted as a catalyst medium where $CO_2$ converted into carbonic acid ($H_2CO_3$) to react with $Ca(OH)_2$ and produce $CaCO_3$ under aqueous conditions. The humidity or free may have also promoted the diffusion of $CO_2$ into the carbide slag sample, leading to higher carbon capture capacity. Yet, it should be noted that excess water or humidity may reduce the diffusion of $CO_2$ and carbon capture capacity. It is also possible that in the absence of humidity or its excess, the carbonation reaction at the surface may lead to the production of $CaCO_3$ (at the surface), which may obstruct the $CO_2$ diffusion to the inner part of the adsorbent.

Figure 13:
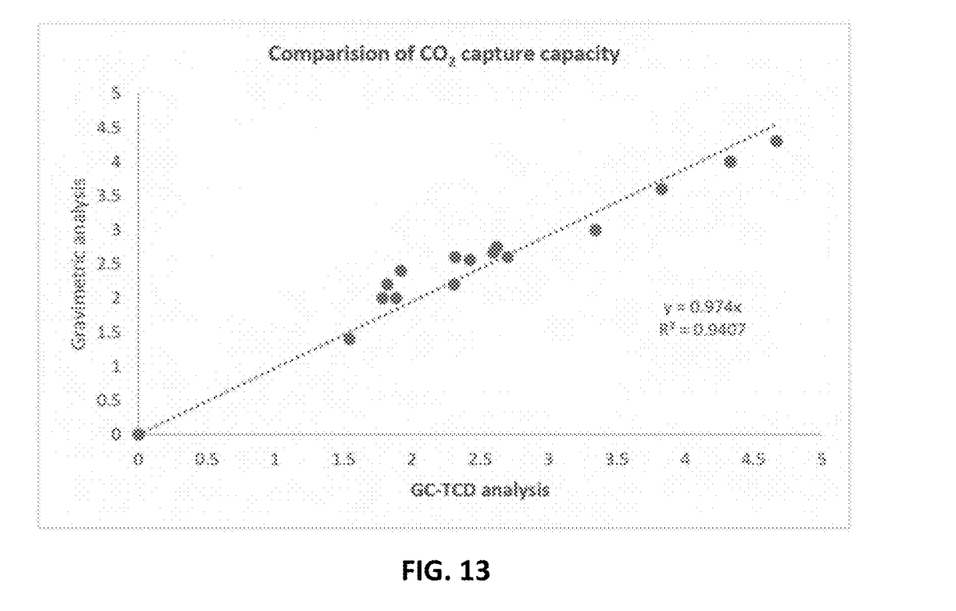
FIG. 13 shows a comparison of results obtained using Gas Chromatography-Thermal Conductivity Detector (GC-TCD) with gravimetric analysis of $CO_2$ capture capacity.

Comparison of results obtained using GC-TCD and gravimetric analysis: The effluent stream from the adsorption process is analyzed by GC-TCD for $CO_2$ concentration. The data obtained from GC-TCD are used to calculate the mass of $CO_2$ adsorbed on the carbide slag powder 16 using eq. 4. Further, the results obtained using eq. 4 were utilized to calculate the $CO_2$ capture capacity by eq. 3 and then compared with the gravimetric analysis results obtained using the digital weighing balance at the end of each experiment.

FIG. 13 represents $CO_2$ capture capacity (%) calculated using GC-TCD results on x-axis and $CO_2$ capture capacity (%) measured using the weighing balance on y-axis.

The results obtained by both the methods are an excellent fit with the r2 value of 0.99.

The maximum $CO_2$ capture capacity observed in this study is ~32.8% in the presence of 20% water content, while ~19.7% $CO_2$ capture capacity was observed in presence of humidity. In the absence of humidity or water content, the maximum $CO_2$ capture capacity is 5.13%.

Advantages of the Invention

The major advantage of the process is that the reaction occurs at ambient temperature and pressure conditions, making it energy-efficient, economical, practical, and easy to operate. Furthermore, no calcination step involving higher temperatures is required as the inventors have developed a new process of activating carbide at low temperature and specifically not requiring the step of calcination. It will be appreciated that by not requiring high temperature calcination, the process of carbon capture as described above, is particularly energy efficient and does not require high temperature conditions in order to operate. As such, the process of carbon capture described hereinabove is environmentally sound, as carbon is captured from the atmosphere with minimal additional energy expenditure (and without the associated increase in carbon emissions generated when performing high temperature heating operations).

Further, carbide slag is available free of cost as a waste material, this helps in reducing the overall cost of obtaining raw material for carbon dioxide capture. Further, using waste carbide slag will also relieve the pressure on the land occupation for disposal of this waste material. As the step of activating carbide slag 16 and the step of reacting with carbon dioxide is performed at low temperatures, there is additional cost saving and well as less heat is generated in the process of capturing carbon dioxide.

Further, the end-product of the reaction is calcium carbonate. This can be used as a raw material in the production of various construction materials to improve the sustainability of the construction industry.

The invention provides a practical, environment-friendly, and economical solution to the global issue of increased $CO_2$ emissions with considerable economic benefits.

What is claimed is:

1. An method of manufacturing active carbide slag adsorbent for capturing carbon dioxide from a gaseous mixture at an ambient temperature, said method comprising
    obtaining carbide slag;
    regulating a water content of the carbide slag such that the water content of the carbide slag is approximately 10% to 40% of a dry mass of the carbide slag, and wherein, the step of regulating the water content of the carbide slag comprises heating the carbide slag at a temperature of about 105° C. and -contacting the active carbide slag adsorbent with the gaseous mixture containing carbon dioxide, thereby permitting the active carbide slag adsorbent to capture carbon dioxide.

2. The method of claim 1 wherein, the water content of the carbide slag is regulated such that the water content of the carbide slag is approximately 20% of a dry mass of the carbide slag.

3. The method of claim 1 wherein, the step of heating the carbide slag is carried out for about 2 hours.

4. The method of claim 1 wherein, the gaseous mixture is any gas containing carbon dioxide in gaseous form selected from any of or combination of effluent gases, atmosphere, gaseous reaction products and carbon dioxide enriched gas stream.

5. The method of claim 1 wherein, the $CO_2$ capture capacity of the active carbide slag adsorbent is 4.32% to 19.75% by weight.

* * * * *